United States Patent
Jaderberg et al.

(10) Patent No.: US 11,604,985 B2
(45) Date of Patent: Mar. 14, 2023

(54) POPULATION BASED TRAINING OF NEURAL NETWORKS

(71) Applicant: DeepMind Technologies Limited, London (GB)

(72) Inventors: Maxwell Elliot Jaderberg, London (GB); Wojciech Czarnecki, London (GB); Timothy Frederick Goldie Green, London (GB); Valentin Clement Dalibard, London (GB)

(73) Assignee: DeepMind Technologies Limited, London (GB)

( * ) Notice: Subject to any disclaimer, the term of this patent is extended or adjusted under 35 U.S.C. 154(b) by 356 days.

(21) Appl. No.: 16/766,631

(22) PCT Filed: Nov. 22, 2018

(86) PCT No.: PCT/EP2018/082162
§ 371 (c)(1),
(2) Date: May 22, 2020

(87) PCT Pub. No.: WO2019/101836
PCT Pub. Date: May 31, 2019

(65) Prior Publication Data
US 2021/0004676 A1 Jan. 7, 2021

Related U.S. Application Data (60) Provisional application No. 62/590,177, filed on Nov. 22, 2017.

(51) Int. Cl.
*G06N 3/08* (2006.01)
*G06N 3/04* (2023.01)
(52) U.S. Cl.
CPC .............. *G06N 3/08* (2013.01); *G06N 3/0481* (2013.01)

(58) Field of Classification Search
CPC ........ G06N 3/08; G06N 3/0481; G06N 3/006; G06N 3/0454; G06N 3/0472; G06N 3/086
See application file for complete search history.

(56) References Cited

U.S. PATENT DOCUMENTS

| 6,523,016 | B1 | 2/2003 | Michalski | |
| 2019/0034762 | A1* | 1/2019 | Hashimoto | ............ G06V 10/82 |
| 2019/0370648 | A1* | 12/2019 | Zoph | ...................... G06N 3/082 |

FOREIGN PATENT DOCUMENTS

| CN | 107229972 | 10/2017 |
| CN | 107301459 | 10/2017 |
| EP | 1557788 | 7/2005 |

OTHER PUBLICATIONS

Office Action in European Appln. No. 18807623.6, dated Jul. 13, 2021, 11 pages.

(Continued)

*Primary Examiner* — Jean B Jeanglaude
(74) *Attorney, Agent, or Firm* — Fish & Richardson P.C.

(57) ABSTRACT

Methods, systems, and apparatus, including computer programs encoded on computer storage media, for training a neural network. A method includes: training a neural network having multiple network parameters to perform a particular neural network task and to determine trained values of the network parameters using an iterative training process having multiple hyperparameters, the method includes: maintaining multiple candidate neural networks and, for each of the multiple candidate neural networks, data specifying: (i) respective values of network parameters for the candidate neural network, (ii) respective values of hyperparameters for the candidate neural network, and (iii) a quality measure that measures a performance of the candidate neural network on the particular neural network task;

(Continued)

and for each of the multiple candidate neural networks, repeatedly performing additional training operations.

20 Claims, 3 Drawing Sheets

(56) References Cited

OTHER PUBLICATIONS

Abadi et al, "TensorFlow: A system for large-scale machine learning", 12th USENIX Symposium on Operating Systems Design and Implementation, Nov. 2016, 21 pages.
Agarwal et al, "Oracle inequalities for computationally budgeted model selection," Proceedings of the 24th Annual Conference on Learning Theory, 2011, pp. 69-86.
Back et al, "An overview of parameter control methods by self-adaptation in evolutionary algorithms," Fundamenta Informaticae, 1998, 35(1-4):51-66.
Beattie et al, "Deepmind lab," arXiv preprint arXiv:1612.03801, Dec. 2016, 11 pages.
Bellemare et al, "The arcade learning environment: An evaluation platform for general agents," J. Artif. Intell. Res.(JAIR), Jun. 2013, pp. 47:253-279.
Bengio, "Gradient-Based Optimization of Hyperparameters," Neural Computation, Sep. 1999, 18 pages.
Bergstra et al, "Algorithms for hyper-parameter optimization," Advances in Neural Information Processing Systems, Dec. 2011, pp. 2546-2554.
Bergstra et al., "Random search for hyper-parameter optimization," Journal of Machine Learning Research, Feb. 2012, 281-305.
Castillo et al, "G-prop-III: Global optimization of multilayer perceptrons using an evolutionaiy algorithm," Proceedings of the 1st Annual Conference on Genetic and Evolutionary Computation, Jul. 1999, 8 pages.
Castillo et al, "Lamarckian, evolution, and the Baldwin effect in evolutionary neural networks," arXiv preprint cs/0603004, Mar. 2006, 5 pages.
Claesen et al., "Hyperparameter Search in Machine Learning," https://aixiv.org/abs/1502.02127v1, Feb. 2015, 5 pages.
Clune et al, "Natural selection fails to optimize mutation rates for long-term adaptation on rugged fitness landscapes," PLoS Computational Biology, Sep. 2008, 4(9):e1000187: 8 pages.
Domhan et al, "Speeding up automatic hyperparameter optimization of deep neural networks by extrapolation of learning curves," IJCAI, Jun. 2015, pp. 3460-3468.
Fernando et al, "Convolution by Evolution: Differentiable Pattern Producting Networks," arxiv.org, Cornell University Library, Jun. 2016, 109-116.
Fernando et al., "Convolution by Evolution: Differentiable Pattern Producing Networks," https://arxiv.org/abs/1606.02580, Jun. 2016, 8 pages.
Friedrichs et al, "Evolutionary tuning of multiple SVM parameters" Elxevier Science, Oct. 2004, 13 pages.
Gagliolo et al., "Learning dynamic algorithm portfolios," Annals of Mathematics and Artificial Intelligence, Aug. 2006, 47(3):295-328.
Gloger, "Self-adaptive evolutionary algorithms," Universität Paderborn, Jan. 2004, 17 pages.
Golovin et al, "Google vizier: A service for black-box optimization," Proceedings of the 23rd ACM SIGKDD International Conference on Knowledge Discovery and Data Mining, ACM, Aug. 2017, 1487-1496.
Gonzalez et al, "Batch Bayesian optimization via local penalization," Artificial Intelligence and Statistics, May 2016, pp. 648-657.
Goodfellow et al., "Generative adversarial nets," Advances in Neural Information Processing Systems, Dec. 2014, 9 pages.
Gruau et al., "Adding Learning to the Cellular Development of Neural Networks: Evolution and the Baldwin Effect," Evolutionary Computation, 1993, 1(3):213-233.
Gulrajani et al., "Improved training of Wasserstein GANs," Advances in Neural Information Processing Systems, Mar. 2017, 11 pages.
György et al., "Efficient multi-start strategies for local search algorithms," Journal of Artificial Intelligence Research, Jul. 2011, pp. 407-444.
Hansen et al, "Completely Derandomized Self-Adaptation in Evolution Strategies" Evolutionary Computation, Jun. 2001, 9(2):39 pages.
Hinton et al., "Lecture 6.5-rmsprop: Divide the gradient by a running average of its recent magnitude," COURSERA: Neural networks for machine learning, retrieved from URL <https://www.cs.toronto.edu/~tijmen/csc321/slides/lecture_slides_lec6.pdf>, 2012, 31 pages.
Houck et al, "Empirical investigation of the benefits of partial lamarckianism." Evolutionary Computation, Mar. 1997, 5(1):31-60.
Hüsken et al., "Optimization for problem classes-neural networks that learn to learn," Combinations of Evolutionary Computation and Neural Networks, May 2000, 12 pages.
Hutter et al., "Sequential model-based optimization for general algorithm configuration," Lion, 2011, pp. 5:507-523.
Igel et al, "Evolutionary optimization of neural systems: The use of strategy adaptation," Trends and Applications in Constructive Approximation, 2005, 23 pages.
Jaderberg et al, "Reinforcement learning with unsupervised auxiliary tasks," arXiv preprint arXiv:1611.05397, Nov. 2016, 14 pages.
Jaderberg et al., "Population Based Training of Neural Networks," https://arxiv.org/abs/1711.09846v2, Nov. 2017, 21 pages.
Kingma et al., "Adam: A method for stochastic optimization," https://arxiv.org/abs/1412.6980v8, Jul. 2015, 15 pages.
Klein et al, "Fast Bayesian optimization of machine learning hyperparameters on large datasets," arXiv preprint arXiv:1605.07079, May 2016, 17 pages.
Ku et al., "Exploring the effects of Lamarckian and Baldwinian learning in evolving recurrent neural networks," Proceedings of 1997 IEEE International Conference on Evolutionary Computation, Apr. 1997, 5 pages.
Li et al, "Hyperband: A Novel Bandit-Based Approach to Hyperparameter Optimization," https://arxiv.org/abs/1603.06560v3, Nov. 2016, 48 pages.
Liu et al, "Hierarchical representations for efficient architecture search," https://arxiv.org/abs/1711.00436v1, Nov. 2017, 13 pages.
Loshchilov et al., "CMA-ES for Hyperparameter Optimization of Deep Neural Networks," https://arxiv.org/abs/1604.07269, Apr. 2016, 8 pages.
Loshchilov et al., "SGDR: Stochastic Gradient Descent with Warm Restarts," https://arxiv.org/abs/1608.03983, 2016, 16 pages.
Masse et al., "Speed learning on the fly," arXiv preprint arXiv:1511.02540, Nov. 2015, 25 pages.
Mnih et al., "Asynchronous methods for deep reinforcement learning," International Conference on Machine Learning, Jun. 2016, 10 pages.
Panayotov et al, "Librispeech: An ASR corpus based on public domain audio books," 2015 IEEE International Conference on Acoustics, Speech and Signal Processing (ICASSP), Apr. 2015, 5 pages.
PCT International Preliminary Report on Patentability in International Appln. No. PCT/EP2018/082162, dated Jun. 4, 2020, 12 pages.
PCT International Search Report and Written Opinion in International Appln. No. PCT/EP2018/082162, dated Feb. 27, 2019, 19 pages.
Radford et al, "Unsupervised representation learning with deep convolutional generative adversarial networks," https://arxiv.org/abs/1511.06434, last revised Jan. 2016, 16 pages.
Rasley et al, "Hyperdrive: Exploring hyperparameters with POP scheduling." Proceedings of the 18th International Middleware Conference, Dec. 2017, 13 pages.
Real et al, "Large-scale evolution of image classifiers," arXiv preprint arXiv:1703.01041, Jun. 2017, 18 pages.
Real et al, "Regularized Evolution for Image Classifier Architecture Search" arXiv, Oct. 2018, 16 pages.

(56) References Cited

OTHER PUBLICATIONS

Renders et al., "Hybrid methods using genetic algorithms for global optimization," IEEE Transactions on Systems, Man, and Cybernetics, Part B (Cybernetics), Apr. 1996, 26(2):243-258.
Rosca et al, "Variational approaches for auto-encoding generative adversarial networks," arXiv preprint arXiv:1706.04987, Oct. 2017, 21 pages.
Sabharwal et al, "Selecting Near-Optimal Learners via Incremental Data Allocation," AAAI, Mar. 2016, 9 pages.
Salimans et al, "Improved techniques for training GANs," Advances in Neural Information Processing Systems, Dec. 2016, 9 pages.
Salustowicz et al., "Probabilistic Incremental Program Evolution: Stochastic Search Through Program Space," European Conference on Machine Learning, 1997, 213-220.
Shah et al., "Parallel predictive entropy search for batch global optimization of expensive objective functions," Advances in Neural Information Processing Systems, Dec. 2015, 9 pages.
Smith, "Cyclical learning rates for training neural networks," https://arxiv.org/abs/1506.01186, Apr. 2017, 10 pages.
Snoek et al, "Practical Bayesian optimization of machine learning algorithms," Advances in neural information processing systems, 2012, 9 pages.
Snoek et al, "Scalable Bayesian optimization using deep neural networks," International Conference on Machine Learning, Jun. 2015, 10 pages.
Spears, "Adapting crossover in evolutionary algorithms," Proceedings of the Fourth Annual Conference on Evolutionary Programming, Mar. 1995, 18 pages.
Springenberg et al, "Bayesian optimization with robust Bayesian neural networks," Advances in Neural Information Processing Systems, Dec. 2016, pp. 9 pages.
Srinivas et al, "Gaussian process optimization in the bandit setting: No regret and experimental design," arXiv preprint arXiv:0912.3995, 2009, 17 pages.
Swersky et al, "Freeze-thaw Bayesian optimization," arXiv preprint arXiv:1406.3896, Jun. 2014, 12 pages.
Swersky et al, "Multi-task Bayesian optimization," Advances in neural information processing systems, Jan. 2013, 9 pages.
Van den Oord et al, "Wavenet: A Generative Model for Raw Audio" https://arxiv.org/abs/1609.03499, Sep. 2016, 15 pages.
Vaswani et al, "Attention is all you need," arXiv preprint arXiv:1706.03762, 2017, 11 pages.
Vezhnevets et al, "Feudal networks for hierarchical reinforcement learning," arXiv preprint arXiv:1703.01161, Mar. 2017, 12 pages.
Vinyals et al., "Starcraft II: A new challenge for reinforcement learning." arXiv preprint arXiv:1708.04782, Aug. 2017, 20 pages.
Welch, "The generalization of 'student's' problem when several different population variances are involved," Biometrika, Jan. 1947, 34(1/2):28-35.
Wu et al., "The parallel knowledge gradient method for batch Bayesian optimization," Advances in Neural Information Processing Systems, Dec. 2016, 9 pages.
Xue et al, "A survey on evolutionary computation approaches to feature selection," IEEE Transactions on Evolutionary Computation, Aug. 2016, 20(4):606-625.
Yang et al, "LR-GAN: Layered recursive generative adversarial networks for image generation." https://arxiv.org/abs/1703.01560, Aug. 2017, 21 pages.
Young et al., "Optimizing deep learning hyper-parameters through an evolutionary algorithm," Proceedings of the Workshop on Machine Learning in High-Performance Computing Environments, Nov. 2015, 5 pages.
Zhang et al., "Evolutionary computation meets machine learning: A survey," IEEE Computational Intelligence Magazine, Nov. 2011, 6(4):68-75.

* cited by examiner

FIG. 3

POPULATION BASED TRAINING OF NEURAL NETWORKS

CROSS-REFERENCE TO RELATED APPLICATIONS

This application is a National Stage Application under 35 U.S.C. § 371 and claims the benefit of International Application No. PCT/EP2018/082162, filed Nov. 22, 2018, which claims priority to Provisional Application No. 62/590,177, filed on Nov. 22, 2017, the entire contents of which are incorporated herein by reference.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network (i.e., the next hidden layer or the output layer). Each layer of the network generates an output from a received input in accordance with current values of a respective set of parameters.

SUMMARY

This specification describes a system implemented as computer programs on one or more computers in one or more locations that trains a neural network having a plurality of network parameters to perform a particular neural network task. In particular, the system trains the neural network to determine trained values of the network parameters using an iterative training process that has a plurality of hyperparameters.

During the training of the neural network, the system maintains a plurality of candidate neural networks and, for each of the candidate neural networks, data specifying: (i) respective values of the network parameters for the candidate neural network, (ii) respective values of the hyperparameters for the candidate neural network, and (iii) a quality measure that measures a performance of the candidate neural network on the particular neural network task. The candidate neural networks that are maintained are collectively referred to as the population in this specification.

In order to train the neural network, the system repeatedly performs a set of training operations for each of the plurality of candidate neural networks.

In particular, as part of performing the training operations, the system trains the candidate neural network using the iterative training process and in accordance with the maintained values of the hyperparameters for the candidate neural network until termination criteria are satisfied to determine updated values of the network parameters for the candidate neural network from the maintained values of the network parameters for the candidate neural network.

The system then determines an updated quality measure for the candidate neural network in accordance with the updated values of the network parameters for the candidate neural network and the maintained values of the hyperparameters for the candidate neural network and determining, based at least on the maintained quality measures for the candidate neural networks and the updated quality measure for the candidate neural network, new values of the hyperparameters and the network parameters for the candidate neural network.

The system determines a new quality measure for the candidate neural network in accordance with the new values of the network parameters for the candidate neural network and the new values of the hyperparameters for the candidate neural network and updates the maintained data for the candidate neural network to specify the new values of the hyperparameters, the new values of the network parameters, and the new quality measure.

After repeatedly performing the set of training operations, the system selects the trained values of the network parameters from the parameter values in the maintained data based on the maintained quality measures for the candidate neural networks after the training operations have repeatedly been performed.

Generally, the network parameters are values that impact the operations performed by the neural network and that are adjusted as part of the iterative training process. For example, the network parameters can include values of weight matrices and, in some cases, bias vectors, of the layers of the neural network.

The hyperparameters are values that are not modified by the iterative training process. The hyperparameters can include values that impact how the values of the network parameters are updated by the training process e.g., the learning rate or other update rule that defines how the gradients determine at the current training iteration are used to update the network parameter values, objective function values, e.g., entropy cost, weights assigned to various terms of the objective function, and so on.

The neural network can be configured to receive any kind of digital data input and to generate any kind of score, classification, or regression output based on the input.

For example, if the inputs to the neural network are images or features that have been extracted from images, the output generated by the neural network for a given image may be scores for each of a set of object categories, with each score representing an estimated likelihood that the image contains an image of an object belonging to the category.

As another example, if the input to the neural network is data characterizing the state of an environment being interacted with by an agent, e.g., a robot or other mechanical agent, the output generated by the neural network can be a policy output that defines a control input for the agent. For example, the output can include or define a respective probability for each action in a set of possible actions to be performed by the agent or a respective Q value, i.e., a return estimate, for each action in the set of possible actions. As another example, the output can identify a control input in a continuous space of control inputs.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

According to an aspect, there is provided a method of training a neural network having a plurality of network parameters to perform a particular neural network task and to determine trained values of the network parameters using an iterative training process having a plurality of hyperparameters, the method comprising: maintaining a plurality of candidate neural networks and, for each of the candidate neural networks, data specifying: (i) respective values of the network parameters for the candidate neural network, (ii) respective values of the hyperparameters for the candidate neural network, and (iii) a quality measure that measures a performance of the candidate neural network on the particular neural network task; for each of the plurality of candidate neural networks, repeatedly performing the following training operations: training the candidate neural network using the iterative training process and in accordance with the maintained values of the hyperparameters for the candidate neural network until termination criteria are satisfied to determine updated values of the network parameters for the candidate neural network from the maintained values of the network parameters for the candidate neural network, determining an updated quality measure for the candidate neural network in accordance with the updated values of the network parameters for the candidate neural network and the maintained values of the hyperparameters for the candidate neural network, determining, based at least on the maintained quality measures for the candidate neural networks and the updated quality measure for the candidate neural network, new values of the hyperparameters and the network parameters for the candidate neural network, determining a new quality measure for the candidate neural network in accordance with the new values of the network parameters for the candidate neural network and the new values of the hyperparameters for the candidate neural network, and updating the maintained data for the candidate neural network to specify the new values of the hyperparameters, the new values of the network parameters, and the new quality measure; and selecting the trained values of the network parameters from the parameter values in the maintained data based on the maintained quality measures for the candidate neural networks after the training operations have repeatedly been performed.

The method may further comprise the following optional features.

The method may further comprise providing the trained values of the network parameters for use in processing new inputs to the neural network.

Selecting the trained values of the network parameters from the parameter values in the maintained data based on the maintained quality measures for the candidate neural networks may comprise: selecting the maintained parameter values of the candidate neural network having a best maintained quality measure of any of the candidate neural networks after the training operations have repeatedly been performed.

Selecting the trained values of the network parameters from the parameter values in the maintained data based on the maintained quality measures for the candidate neural networks may comprise: determining if the maintained quality measure for the respective candidate neural network in the plurality of candidate neural networks is below a first pre-determined percentage of the candidate neural networks and in response, sampling the maintained parameter values of a candidate neural network having a maintained quality measure above a second pre-determined percentage of the candidate neural networks, after the training operations have repeatedly been performed.

Repeatedly performing the training operations may comprise repeatedly performing the training operations in parallel for each candidate neural network.

Repeatedly performing the training operations may comprise repeatedly performing the training operations for each candidate neural network asynchronously from performing the training operations for each other candidate neural network. That is, the training operations performed for a candidate neural network may be performed independently of the training operations of other candidate neural networks and does not require centralized control of the training operations.

Determining, based at least on the maintained quality measures for the candidate neural networks, new values of the hyperparameters and the network parameters for the candidate neural network may comprise: determining whether the updated quality measure is better than every maintained quality measure; and in response to determining that the updated quality measure is not better than every maintained quality measure, setting the new values of the network parameters to the maintained values of the network parameters for the candidate neural network having the best maintained quality measure.

Optionally, in response to determining that the updated quality measure is better than every maintained quality measure, setting the new values of the network parameters to the updated values of the network parameters.

Determining, based at least on the maintained quality measures for the candidate neural networks, new values of the hyperparameters and the network parameters for the candidate neural network may comprise: setting the new values of the hyperparameters based upon the maintained values of the hyperparameters for the candidate neural network having the best maintained quality measure.

Setting the values of the hyperparameters may comprise randomly permuting one or more of the maintained values of the hyperparameters of the candidate neural network having the best maintained quality measure.

Determining, based at least on the maintained quality measures for the candidate neural networks, new values of the hyperparameters and the network parameters for the candidate neural network may comprise: sampling the new values of the hyperparameters from a prior distribution over possible values for the hyperparameters.

Determining, based at least on the maintained quality measures for the candidate neural networks, new values of the hyperparameters and the network parameters for the candidate neural network may comprise: sampling the new values of the network parameters from a prior distribution over possible values for the network parameters.

Determining, based at least on the maintained quality measures for the candidate neural networks, new values of the hyperparameters and the network parameters for the candidate neural network may comprise: determining whether the updated quality measure is better than every maintained quality measure; and in response to determining that the updated quality measure is not better than every maintained quality measure, setting the new values of the hyperparameters to the maintained values of the hyperparameters for the candidate neural network having the best maintained quality measure.

Training the candidate neural network using the iterative training process and in accordance with the maintained values of the hyperparameters for the candidate neural network until termination criteria are satisfied may comprise training the candidate neural network until a threshold number of iterations of the iterative training process have been performed.

As will be appreciated, the method of training a neural network described above may be implemented by the system for training a neural network and may include any of the method operations described.

The subject matter described in this specification can be implemented in particular implementations so as to realize one or more of the following advantages. By training the neural network in a manner that optimizes parameters and hyperparameters jointly, the system and method can train the neural network to generate network outputs that are more accurate than those generated by networks trained using conventional techniques. Additionally, the system and method can train the neural network more quickly, i.e., in terms of wall clock time, than other approaches.

Additionally, compared to other approaches that first optimize hyperparameters and then train the neural network to optimize the network parameters, the approach described in this specification uses fewer computational resources, i.e., less processing power and processing time, because the hyperparameters and network parameters are optimized jointly. In particular, many conventional approaches first search for acceptable values of the hyperparameters and then begin the training process once acceptable hyperparameter values have been found. This search for acceptable hyperparameter values can be computationally expensive and involve evaluating many possible combinations of hyperparameter values. By effectively optimizing the hyperparameters jointly with the network parameters as described in this specification, this computationally expensive stage of neural network training can be eliminated.

Additionally, the training is such that it may be performed by a distributed system and the described approach only requires values of parameters, hyperparameters, and quality measures to be communicated between candidates, reducing the amount of data that needs to be communicated over the network during the training of the neural network. Moreover, the training operations can be performed asynchronously and in a decentralized manner for each candidate neural network, making it so that the described training technique requires minimal overhead and infrastructure to be used to effectively train the neural network. As such, the training method is specifically adapted to take advantage of parallel processing systems but does not require centralized control of operations or for large amounts of data to be communicated between processing units of the parallel processing system. The method enables neural network training to be carried out more efficiently and to produce a better trained neural network.

As will be apparent, the system and method for training a neural network is universally applicable to any type of neural network for any type of technical task that neural networks may be applied to. For example, the system and method may be used to train a neural network for processing image data and video data, for example to recognize objects or persons in images and video. The network may be used for processing of audio signals, such as speech signals for performing speech recognition, speaker recognition and authentication and spoken language translation. The network may be used to control agent interacting in an environment, for example, a robot operating in a warehouse or an autonomous vehicle operating in the real world. The neural network may be used to perform data encoding or compression.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
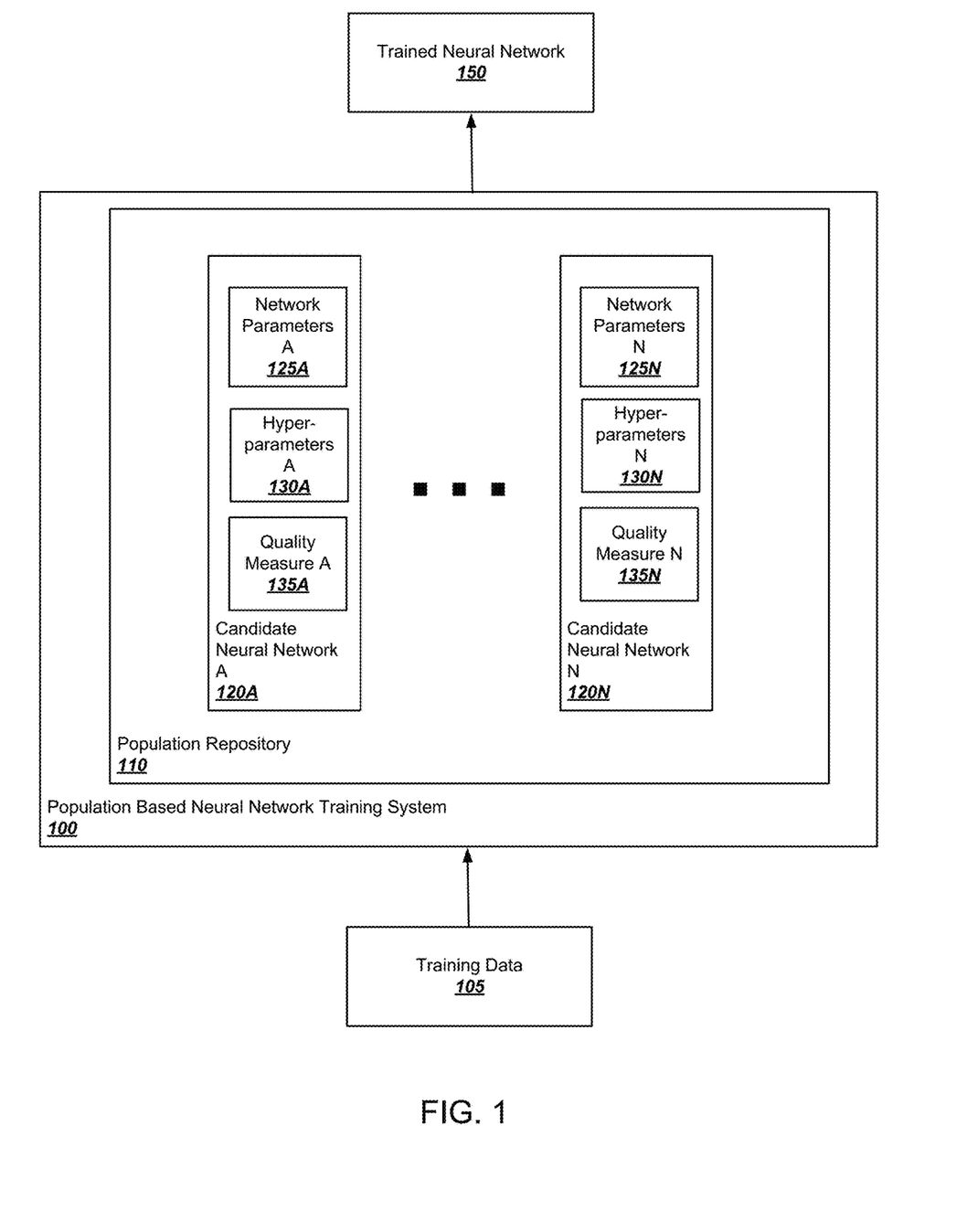
FIG. 1 shows an example population based neural network training system.

FIG. 1 shows an example population based neural network training system 100 ("the system 100"). The system 100 is an example of a system implemented as computer programs on one or more computers in one or more locations, in which the systems, components, and techniques described below can be implemented.

The population based neural network training system 100 is a system that receives, (e.g., from a user of the system) training data 105 for training a neural network to perform a machine learning task. Training data 105 includes multiple training examples and a respective target output for each training example. The target output for a given training example is the output that should be generated by a trained neural network by processing the given training example.

The system 100 can receive the training data 105 in any of a variety of ways. For example, the system 100 can receive training data as an upload from a remote user of the system over a data communication network (e.g., using an application programming interface (API) made available by the system 100). As another example, the system 100 can receive an input from a user specifying which data that is already maintained by the system 100 should be used as the training data 105.

The system 100 generates data 150 specifying a trained neural network using the training data 105. The data 150 specifies the architecture of the trained neural network and the trained values of the parameters of the trained neural network. The parameters of the neural network will be referred to in this specification as "network parameters."

In some implementations, once the neural network has been trained, the system 100 provides data specifying the trained neural network 150 for use in processing new network inputs. That is, the system 100 can output (e.g., by outputting to a user device or by storing in memory accessible to the system) the trained values of the network parameters of the trained neural network 150 for later use in processing inputs using the trained neural network 150. Alternatively or in addition to outputting the trained neural network data 150, the system 100 can instantiate an instance of the neural network having the trained values of the network parameters, receive inputs to be processed, (e.g., through an API offered by the system 100) use the trained neural network 150 to process the received inputs to generate outputs, and then provide the generated outputs in response to the received inputs.

The system 100 includes a population repository 110 storing a plurality of candidate neural networks 120A-N (referred to in this specification as the "population"). The population repository 110 is implemented as one or more logical storage devices in one or more physical locations or as logical storage space allocated in one or more storage devices in one or more physical locations. At any given time during training, the repository 110 stores data specifying the current population of the candidate neural networks 120A-N. In some implementations, the population size (e.g., the number of candidate neural networks trained by the system 100) is greater than ten candidate neural networks. In some implementations, the population size is between twenty and eighty candidate neural networks.

In particular, the population repository 110 stores, for each candidate neural network 120A-N in the current population, a set of maintained values that defines the respective candidate neural network. The set of maintained values includes network parameters, hyperparameters, and a quality measure for each candidate neural network 120A-N (e.g., for candidate neural network A 120A, the set of maintained values includes network parameters A 125A, hyperparameters A 130A, and quality measure A 135A). During training, the network parameters, the hyperparameters, and the quality measure for a candidate neural network are updated in accordance with training operations, including an iterative training process (discussed below).

Generally, the network parameters are values that impact the operations performed by the candidate neural network and are adjusted as part of the iterative training process. For example, the network parameters can include values of weight matrices and, in some cases, bias vectors, of the layers of the candidate neural network. As another example, the network parameters can include values of kernels of convolutional layers in the candidate neural network.

The hyperparameters for a candidate neural network are values that are not modified by the iterative training process. The hyperparameters can include values that impact how the values of the network parameters are updated by training (e.g., learning rate, objective function values, entropy cost, auxiliary loss weights, or weights assigned to various terms of the objective function).

The quality measure for a candidate neural network is a measure of the performance of the candidate neural network on the particular machine learning task. Generally, the function defining the quality measure for the candidate neural network is not required to be differentiable, nor is it required to be the same function used during the iterative training process for the candidate neural network (i.e., may be different from the objective function optimized during the iterative training process).

The system 100 trains each candidate neural network 120A-N by repeatedly performing iterations of an iterative training process to determine updated network parameters for the respective candidate neural network. At certain points during the iterative training process the system 100 also updates the repository 110 by performing additional training operations (discussed below).

To begin the training process, the population based neural network training system 100 pre-populates the population repository 110 with a plurality of candidate neural networks 120A-N for performing the specified machine learning task. In some implementations, the system 100 randomly initializes network parameters 125A-N and hyperparameters 130A-N for each candidate neural network 120A-N.

Alternatively or in addition, the system 100 initializes hyperparameters 130A-N so that each candidate neural network 120A-N in the population is initialized with unique hyperparameters (i.e., for any hyperparameters i and hyperparameters j from the hyperparameters 130A-N, i is not equal to j).

For example, the system 100 generates a list of sets of hyperparameters of incrementally increasing values (so that no two sets of hyperparameters are equal) and initializes each candidate neural network 120A-N with a set of hyperparameters in the list, one set of hyperparameters for each candidate neural network 120A-N.

As another example, the system 100 randomly initializes the hyperparameters for each candidate neural network 120A-N and then scans the candidate neural networks 120A-N to determine if hyperparameters are repeated for any two candidate neural networks. If the system 100 determines two candidate neural networks were initialized with the same hyperparameters, the system generates new randomized hyperparameters for one of the candidate neural networks. The system 100 scans the candidate neural networks 120A-N and generates new randomized hyperparameters until no two candidate neural networks have the same hyperparameters.

Each candidate neural network 120A-N is an architecture that receives inputs that conform to the machine learning task (i.e., inputs that have the format and structure of the training examples in the training data 105) and generates outputs that conform to the machine learning task (i.e., outputs that have the format and structure of the target outputs in the training data 105).

For some machine learning tasks, each candidate neural network 120A-N needs to be trained jointly with one or more other neural networks. For example, in a generative adversarial neural network machine learning task, the system 100 trains a candidate neural network with one other neural network (e.g., a candidate generator neural network and a candidate discriminator neural network). The system 100 then generates data specifying a pair of trained neural networks (e.g., a trained generator neural network and a trained discriminator neural network). For these machine learning tasks, the system 100 maintains for each candidate neural network 120A-N, the maintained values of the respective one or more other neural networks, in the population repository 110.

The system 100 executes training operations for each candidate neural network 120A-N in parallel, asynchronously, and in a decentralized manner. In some implementations, each candidate neural network 120A-N is assigned a respective computing unit for executing population based training. The computing units are configured so that they can operate independently of each other. A computing unit may be, for example, a computer, a core within a computer having multiple cores, or other hardware or software within a computer capable of independently performing the computation required by the system 100 for executing the iterative training process and updating the repository 110 for each candidate neural network 120A-N. In some implementations, only partial independence of operation is achieved, for example, because the system 100 executes training operations for different candidate neural networks that share some resources.

For each of the candidate neural networks 120A-N in the current population, the system 100 executes an iterative training process for training each of the candidate neural networks 120A-N. Additional training operations are necessary to further optimize the network parameters and hyperparameters of a candidate neural network and are discussed with respect to FIG. 2, below.

The iterative training process optimizes the network parameters 125A-N for the population of candidate neural networks 120A-N. In some implementations, the iterative training process optimizes the network parameters 125A-N for the population of candidate neural networks 120A-N in an iterative manner by using a step function (e.g., stochastic gradient descent on some loss function). The step function receives as input the maintained hyperparameters and network parameters for the candidate neural network, and returns the candidate neural network with updated network parameters, in accordance with the maintained hyperparameters. For a single step, the step function can be represented mathematically as: $\Theta' \leftarrow \text{step}(\Theta|h)$ for network parameters $\Theta$, hyperparameters h and updated network parameters $\Theta'$.

After criteria are satisfied for ending execution of the training operations, (i.e., the system 100 determines that training is over, e.g., based on some performance criteria) the system 100 selects an optimal candidate neural network from the candidate neural networks 120A-N. In particular, in some implementations, the system 100 selects the candidate neural network in the population that has the best quality measure. The system 100 can determine the candidate neural network in the population with the best quality measure by comparing each quality measure 135A-N for each candidate neural network 120A-N and, for example, selecting the candidate neural network with the highest quality measure.

The optimal candidate neural network selected is sometimes referred to in this specification as the "best" candidate neural network 120A-N in the population. A candidate neural network that has a higher quality measure than another candidate neural network is considered "better" than the other candidate neural network.

In some implementations, the system 100 generates data specifying a trained neural network 150 from a plurality of optimized neural network candidates. For example, the system 100 compares the quality measures 135A-N for candidate neural networks 120A-N in the population, and selects one or more candidate neural networks 120A-N having a quality measure that meets or exceeds a certain pre-determined performance threshold. Then, the system 100 samples from the plurality of candidate neural networks selected and generates data 150 specifying a trained neural having the network parameters of the sampled candidate neural network.

Repeating the iterative training process until a performance criteria is met for the candidate neural network is computationally expensive, due to the number of iterations (e.g., repeated calls to step($\Theta|h$)) during training. In addition, incorrectly chosen hyperparameters for a candidate neural network can lead to un-optimal trained network parameters or potentially no trained network parameters at all (i.e., the iterative training process does not converge to a set of trained network parameters for the candidate neural network).

Therefore, the population based neural network training system 100 additionally performs meta-optimization, where the hyperparameters and network parameters for each candidate neural network 120A-N are additionally adapted according to the performance of the entire population.

Training operations on the candidate neural networks 120A-N by the system 100 include operations to update the population repository 110 with new network parameters, new hyperparameters, and a new quality measure for each candidate neural network 120A-N. By periodically updating the candidate neural networks 120A-N independent of the iterative training process, the candidate neural networks 120A-N benefit from performance of the population. In addition, updating the hyperparameters before training is over can be more efficient, at least because training does not have to finish before applying more optimal hyperparameters.

In particular, modification of network parameters and hyperparameters for a candidate neural network in accordance with implementations of the disclosed subject matter minimizes error propagated through the system 100 using incorrect or sub-optimal parameters, by periodically checking the performance of other candidate neural networks trained in parallel and copying parameters from more optimized candidate neural networks. By training the candidate neural network in a manner that optimizes network parameters and hyperparameters jointly, the system can generate the trained neural network 150 to produce network outputs that are more accurate than those generated by networks trained using conventional techniques. The combination of updating network parameters and hyperparameters jointly results in increased performance of the candidate neural networks as opposed to updating only the network parameters, or only the hyperparameters.

The population based neural network training system 100 benefits from local optimization by executing, asynchronously and in parallel, an iterative training process for each candidate neural network 120A-N in the population. In particular, because the system executes the training operations for each candidate neural network 120A-N in parallel, the system 100 trains and periodically updates parameters in one training run, resulting in a shorter wall clock time as opposed to training, updating hyperparameters, and then retraining the neural network for the new hyperparameters. Moreover, the training operations can be performed asynchronously and in a decentralized manner for each candidate neural network 120A-N, making it so that the described training technique requires minimal overhead and infrastructure to be used to effectively train the neural network.

Additionally, in training a neural network specified to execute certain machine learning tasks, the best values for the hyperparameters for the neural network can shift significantly at different phases of learning (called a "non-stationary learning problem") in variable and difficult to predict ways. The system 100 schedules periodic hyperparameter shift during training (e.g., learning-rate annealing) automatically and without a massive design-space.

Implementations of the disclosed subject matter demonstrate that the described techniques and systems can be adapted to train neural networks configured to execute a variety of machine learning tasks, as an adaptive strategy to training. Additionally, when the training is distributed, the described approach only requires values of parameters, hyperparameters, and quality measures to be communicated between candidate neural networks 120A-N, reducing the amount of data that needs to be communicated over the network during the training of the neural network 150. In some implementations, the system 100 includes auxiliary losses in the loss function to regularize or otherwise bias the solutions found, or to shape learning dynamics to speed up training. These auxiliary losses can be included in the system 100 without spending a long time tuning weight schedules by hand. That is, weights between different terms in the loss function can be automatically adjusted during the meta-optimization process.

Implementations of the disclosed subject matter allow for model selection at a population level based on attributes not directly trained for by candidate neural networks in the population. In those implementations, the system incorporates the attributes not directly trained for in the quality measure for a candidate neural network. For example, for a machine learning task specifying an image classification task, specifying data for generating a trained neural network includes comparing each candidate neural network not only for accuracy in image classification, but also by evaluating how robust the candidate neural network is to adversarial attack. The system 100 trains candidate neural networks for improved fitness for image classification, but additional training operations include meta-optimization based on, for example, a quality measure that also includes the candidate neural network's robustness to adversarial attack.

In some implementations, for a machine learning task specifying a machine translation task, specifying data for generating a trained neural network 150 includes comparing each candidate neural network 120A-N not only for maximum likelihood of accuracy of translation between the input sequence and output sequence, but also based on an evaluation of the translation according to its bilingual evaluation understory score (BLEU) score (discussed below).

The system 100 also reduces the complexity of training neural networks for machine learning tasks, where two or more neural networks are trained together (e.g., a generator neural network and a discriminator neural network in a generative adversarial neural network framework). In particular, hyperparameters can be set independent of each candidate neural network in the two or more neural networks trained in tandem, as opposed to maintaining one set of hyperparameters for both networks (which requires a more complicated structure for maintaining consistency across the neural networks during training, and is often inefficient).

Figure 2:
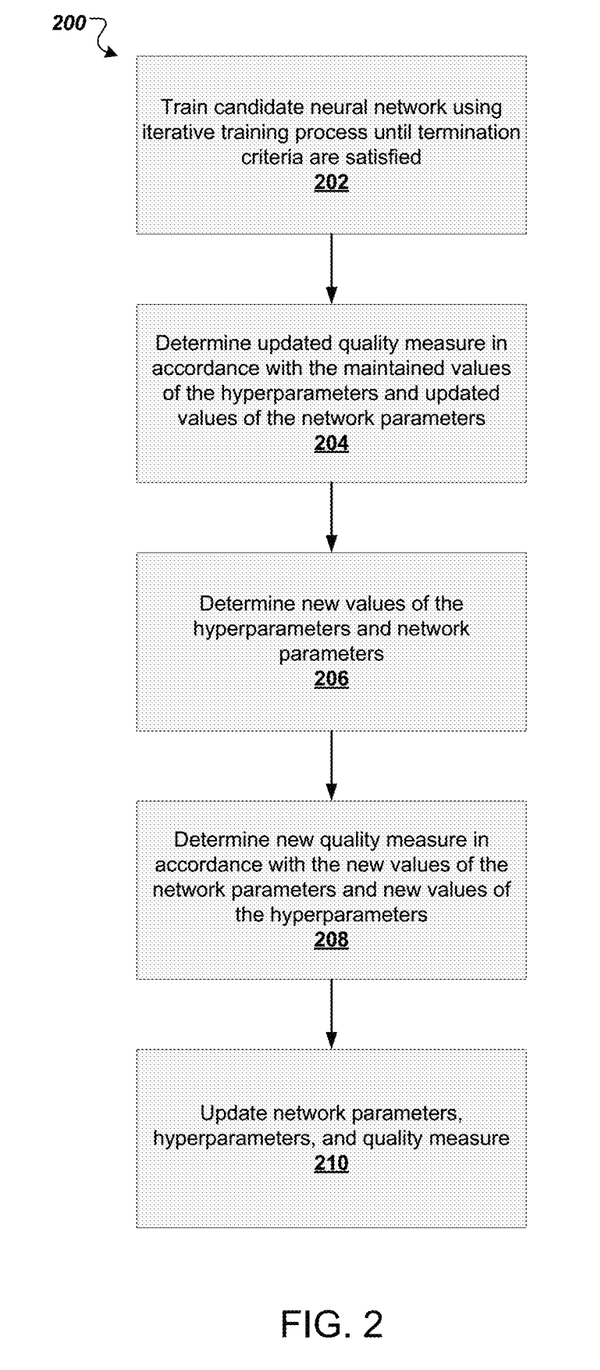
FIG. 2 is a flow chart of an example process for updating a population repository for a candidate neural network.

FIG. 2 is a flow chart of an example process for updating the population repository for a candidate neural network. For convenience, the process 200 will be described as being performed by a system of one or more computers located in one or more locations. For example, a population based neural network system (e.g., the population based neural network training system 100 of FIG. 1) appropriately programmed in accordance with this specification, can perform the process 200.

The system repeatedly performs the process 200 for each candidate neural network in the population. In particular, the system repeatedly performs the process 200 for each candidate neural network asynchronously from performing the process for each other candidate neural network in the population.

The system trains the candidate neural network until termination criteria are satisfied (step 202). Specifically, the system trains the candidate neural network using the maintained values for the hyperparameters and network parameters of the candidate neural network, to iteratively generate updated network parameters for the candidate neural network. Termination criteria are one or more conditions set, that when met by a candidate neural network, cause the system to update the repository for the candidate neural network, with new network parameters, hyperparameters, and quality measure. An example of a termination criterion being met is when a candidate neural network has been training for a set period of time or a fixed number of iterations of the iterative training process. Another example of a termination criterion being met is when a candidate neural network falls below a certain performance threshold. In those cases, the system continues the process 200 to update the repository for the candidate neural network.

Next, the system determines an updated quality measure for the candidate neural network in accordance with the updated values of the network parameters for the candidate neural network and the maintained values of the hyperparameters for the candidate neural network (step 204).

Specifically, the system executes the iterative training process on the candidate neural network to obtain updated network parameters; however, the maintained quality measure of the candidate neural network is not updated during the iterative training process to reflect the potential performance increase of the candidate neural network as a result of the updated network parameters. Therefore, before the system can compare the performance of the candidate neural networks to determine new network parameters and hyperparameters of the candidate neural network, the system performs step 204 to determine the updated quality measure for the candidate neural network. Examples for how the system determines the updated quality measure for the candidate neural network are discussed below.

The system determines new values of the hyperparameters and network parameters for the candidate neural network (step 206). In some implementations, the system determines new values of the hyperparameters and network parameters for the candidate neural network based at least on the maintained quality measures for the population of candidate neural networks in the population repository and the updated quality measure of the candidate neural network determined at step 204.

For example, the system determines the "best" candidate neural network having the highest quality measure in the current population, and determines if the best candidate neural network is better than the candidate neural network (e.g., by comparing the quality measures of both candidate neural networks and determining which quality measure is higher). If the best candidate neural network is better than the candidate neural network, then the system determines new values of the network parameters for the candidate neural network by "exploiting" (i.e., taking) the network parameters of the best candidate neural network in the current population. If the candidate neural network is better than the best candidate neural network in the population, then the new network parameters for the candidate neural network are set to the updated network parameters of the candidate neural network (i.e., the system does not exploit the current population).

Alternatively or in addition, the system generates new values of the hyperparameters in the same way the system determines new values for the network parameters of the candidate neural network (i.e., the system "exploits" the hyperparameters of the best candidate neural network in the population and sets those hyperparameters as the hyperparameters of the candidate neural network).

Determining new network parameters for the candidate neural network by "exploiting" is represented mathematically as $\Theta'' \leftarrow \text{exploit}(\Theta')$, for updated network parameters $\Theta'$ of the candidate neural network and returns new network parameters Θ" for the candidate neural network. Other implementations of exploit(•) are discussed in accordance with examples below.

In some implementations, the system "explores" for new hyperparameters for the candidate neural network by determining new hyperparameters using a mathematical operation that takes the maintained hyperparameters of the candidate neural network as input. For example, the system determines new hyperparameters for the candidate neural network by randomly perturbing the hyperparameters of the candidate neural network with noise and setting the perturbed values as the new hyperparameters for the candidate neural network. Alternatively, the system determines new hyperparameters of the candidate neural network by sampling from a distribution over possible values for the hyperparameters. Alternatively, the system determines new hyperparameters for the candidate neural network by incrementing or decrementing the values of the hyperparameters of the candidate neural network and setting the incremented or decremented values as the new hyperparameters for the candidate neural network.

Alternatively or in addition, the system generates new values of the network parameters in the same way the system determines new values for the hyperparameters of the candidate neural network (i.e., the system "explores" for new network parameters by randomly perturbing the updated network parameters of the candidate neural network with noise and setting the perturbed values as the new network parameters for the candidate neural network).

In some implementations, the system first determines whether the candidate neural network is the best candidate neural network in the current population (e.g., by comparing the quality measure of the candidate neural network with the quality measures of the other candidate neural networks in the population). If the candidate neural network is the best candidate neural network, then the system does not "explore" for new hyperparameters for the candidate neural network.

In some implementations, the system determines new hyperparameters for the candidate neural network by "exploring" regardless of whether or not the candidate neural network is the best in the current population.

Determining new hyperparameters for the candidate neural network by "exploring" is represented mathematically as: h'←explore(h) for hyperparameters h of the candidate neural network, and returns new hyperparameters h' for the candidate neural network. Other implementations of explore(•) are discussed in accordance with examples below.

In the exemplary process 200 for updating the population repository for the candidate neural network, the system updates the hyperparameters and network parameters jointly for the candidate neural network. In some implementations, the system may intermittently update the population repository with only new hyperparameters for the candidate neural network, or only new network parameters for the candidate neural network (e.g., for multiple iterations of the process 200 on the candidate neural network, the system may only update the repository with new hyperparameters or new network parameters for the candidate neural network after every other iteration of the process 200).

The system determines a new quality measure for the candidate neural network in accordance with the new values of the network parameters and hyperparameters for the candidate neural network (step 208). Specifically, the system takes the new values of the network parameters and hyperparameters for the candidate neural network determined in step 206 to determine the new quality measure for the candidate neural network.

The system updates the population repository with the new quality measure, network parameters, and hyperparameters for the candidate neural network (step 210). Specifically, the system updates the population repository with the new network parameters and hyperparameters for the candidate neural network determined in step 206, and the new quality measure for the candidate neural network determined in step 208.

After the system executes process 200 for the candidate neural network, the iterative training process continues. Specifically, the system trains the candidate neural network using the new hyperparameters and new network parameters of the candidate neural network, to iteratively generate updated network parameters for the candidate neural network.

The system will continue the iterative training process for the candidate neural network until either the termination criteria is satisfied (and the system repeats the process 200 for the candidate neural network) or performance criteria is satisfied to indicate to the system to stop training.

Figure 3:
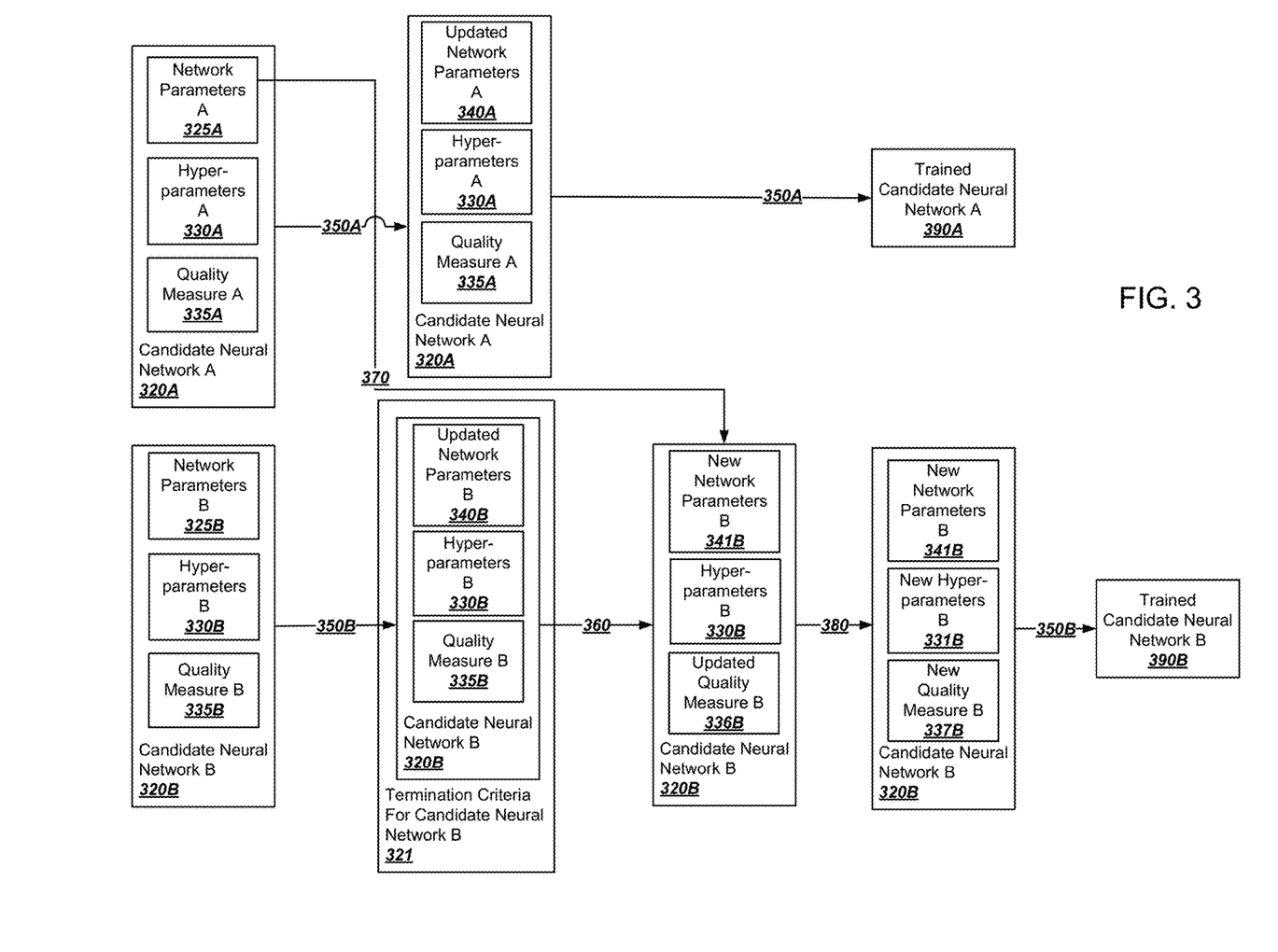
FIG. 3 shows an example candidate neural network before and after updating the population repository for the candidate neural network.

FIG. 3 shows an example candidate neural network before and after updating the population repository for the candidate neural network. For illustrative purposes, FIG. 3 shows a candidate neural network A 320A ("network A") and a candidate neural network 320B ("network B") before and after termination criteria for candidate neural network B 321. Network A 320A in this example is better than Network B 320B.

The system executes iterative training processes for network A 320A and network B 320B, in parallel (indicated by line connectors 350A and 350B, respectively). As the system 100 executes the iterative training processes for network A 320A and network B 320B, network parameters A 325A and network parameters B 325B are updated and replaced by updated network parameters A 340A and updated network parameters B 340B, respectively.

The system 100 determines an updated quality measure B 336B for the network B 320B with the values of the hyperparameters B 330B and the updated network parameters B 340B, (i.e., the system 100 executes step 204 of process 200 for network B 320B, represented as line connector 360 in FIG. 3). The system 100 determines new hyperparameters B 331B and new network parameters B 341B for the network B 320B (i.e., the system 100 executes step 206 of process 200 for network B 320B).

The system 100 compares the quality measure A 335A and the quality measure B 335B, and sets new network parameters B 341B to be equal to the updated network parameters A 340A (represented as line connector 370), because in this example, network A 320A is better than network B 320B. The system 100 determines new hyperparameters B 341B for the network B 320B, represented by line connector 380.

The system 100 determines from the new network parameters B 341B and the new hyperparameters B 331B for the network B 320B, a new quality measure B 337B (i.e., the system 100 executes step 208 of process 200 for the network B 320B).

The system 100 updates the population repository 110 for the network B 320B to specify the new quality measure B 337B, new network parameters B 341B, and new hyperparameters B 331B (i.e., the system 100 executes step 210 of process 200 for the network B 320B). The system 100 resumes the iterative training process for network B 320B.

While the system 100 determined new values for the network B 320B and updated the repository 110, system 100 continued to train network 320A, in parallel. When training is over, the system 100 specifies data for trained neural network A 390A and trained neural network B 390B.

Examples of certain implementations of the described meta-optimization schemes follow. In the below examples, • is a placeholder for a function $f(\bullet)$ and represents zero or more arguments for the function $f$.

Training operations executed by a population based neural network training system for each candidate neural network are described with the following definitions:

step(•): How the system in the exemplary implementation iterates one step in the iterative training process, for a candidate neural network.

eval(•): How the system determines the quality measure for the candidate neural network.

ready(•): The termination criteria for the system, represented as a function that returns a value indicating whether the termination criteria that cause the system to update the population repository are satisfied for the candidate neural network.

exploit(•): How the system updates the population repository with new values for the network parameters of the candidate neural network.

explore(•): How the system updates the population repository with new values for the hyperparameters of the candidate neural network.

In one example, a reinforcement learning task is specified as the machine learning task for the system. Each candidate neural network receives inputs and generates outputs that conform to a deep reinforcement learning task. In reinforcement learning, the aim is to find a policy to maximize expected episodic return within an environment. An exemplary set of training operations for population based neural network training for a deep reinforcement machine learning task includes:

step(•): The system executes gradient descent on the values of the weights in the network parameters for the candidate neural network to determine updated network parameters (e.g., RMSProp).

eval(•): The system updates the quality measure of a candidate neural network based on the mean value of a pre-determined number of previous episodic rewards (e.g., 10 episodic rewards). Specifically, the quality measure of the candidate neural network is the mean value of the pre-determined number of previous episodic rewards. The candidate neural network with the highest mean episodic reward has the highest quality measure and is considered the "best" in terms of measured fitness.

ready(•): Termination criteria are satisfied after a fixed number of iterations (e.g., $1 \times 10^6$ to $10 \times 10^6$ iterations of step(•)).

exploit(•): The system uniformly samples another candidate neural network in the population and compares the last 10 episode rewards using Welch's t-test (also referred to as Welch's unequal variances t-test). If the sampled candidate neural network has a higher quality measure and satisfies the t-test, the system 100 sets the new network parameters and new hyperparameters of the candidate neural network to the values of the sampled candidate neural network.

Alternatively, the system ranks all candidate neural networks in the population by mean episode reward (i.e., rank each candidate neural network by ordering each quality measure from best to worst). If the candidate neural network is ranked below a certain threshold (e.g., bottom 20% of all candidate neural networks), the system 100 samples a candidate neural network ranked above a certain threshold (e.g., top 20% of all candidate neural networks) and sets the new network parameters and new hyperparameters of the candidate neural network to the values of the sampled candidate neural network. If the candidate neural network is ranked better than the bottom 20%, then the system does not exploit the population for new network parameters and new hyperparameters for the candidate neural network.

explore(•): The system randomly perturbs the hyperparameters of the candidate neural network by a pre-determined factor (e.g., by a factor of 1.2 or 0.8) and sets the perturbed hyperparameters as the new hyperparameters for the candidate neural network.

Alternatively, the system resamples the hyperparameters from the original prior distribution of hyperparameters for the candidate neural network, according to some probability, and sets the resampled hyperparameters as the new hyperparameters of the candidate neural network.

In another example, a supervised learning task is specified as the machine learning task for the system. Each candidate neural network receives inputs and generates outputs that conform to a supervised machine learning task. One example of a supervised learning task is machine translation from one language to another language. In particular, the task is to encode a source sequence of words in one language, and output a sequence in a different target language. An exemplary set of training operations for population based neural network training of a machine translation learning task includes:

step(•): The system executes gradient descent on the values of the weights in the network parameters for a candidate neural network, with adaptive moment estimation, (e.g., ADAM) to determine updated network parameters of the candidate neural network.

eval(•): The system updates the quality measure of the candidate neural network based on evaluation of the candidate neural network's bilingual evaluation understudy score (BLEU score). Specifically, the quality measure for a candidate neural network is its BLEU score. The BLEU score is an evaluation of a generated sequence compared with a reference sequence. A BLEU score of 1.0 is a perfect match between the generated sequence and the reference sequence, and a BLEU score of 0.0 is a perfect mis-match between the generated sequence and the reference sequence. The candidate neural network with the highest mean BLEU score has the highest quality measure and is considered the "best" in terms of measured fitness. Because the BLEU score is not differentiable, the BLEU score cannot directly be used as the loss function optimized during the iterative training process.

ready(•): Termination criteria are satisfied after a fixed number of iterations (e.g., $2 \times 10^8$ iterations of step(•).

exploit(•): The system uniformly samples another candidate neural network in the population and compares the last 10 BLEU scores using Welch's t-test. If the sampled candidate neural network has a higher quality measure and satisfies the t-test, set the new network parameters and new hyperparameters of the candidate neural network to the values of the sampled candidate neural network.

explore(•): The system randomly perturbs the hyperparameters of the candidate neural network by a pre-determined factor (e.g., by a factor of 1.2 or 0.8) and sets the perturbed hyperparameters as the new hyperparameters for the candidate neural network.

Alternatively, the system resamples the hyperparameters from the original distribution of hyperparameters for the candidate neural network, according to some probability, and sets the resampled hyperparameters as the new hyperparameters of the candidate neural network.

In some implementations, a generative adversarial network (GAN) task is specified as the machine learning task for the population based neural network training system. Each candidate neural network receives inputs and generates outputs that conform to a GAN task. In a GAN task, two computing modules, represented as separate neural networks are defined: a generator neural network and a discriminator neural network. The discriminator takes as input samples from the generator and a real data distribution, and is trained to predict whether inputs are real or generated. For example, the generator maps simulated images to real-world images with the objective of maximally fooling the discriminator into classifying or scoring its images as real. An exemplary set of training operations for a population of pairs of candidate generator and discriminator neural networks of a GAN task includes:

step(•): For the candidate discriminator neural network, the system executes gradient descent a pre-determined number of iterations (e.g., the system executes gradient descent 5 times on the candidate discriminator neural network). The system updates the candidate generator neural network once using the ADAM optimizer. The system trains using a Wasserstein GAN gradient penalty (WGAN-GP) (Gulrajani, et. al) objective where the candidate discriminator neural network estimates the Wasserstein distance between the real and generated data distributions, with the Lipschitz constraint enforced by regularizing its input gradient to have a unit norm.

old (e.g., top 20% of all pairs candidate neural networks) and sets the new network parameters and new hyperparameters of the generator candidate neural network to the values of the network parameters and hyperparameters of the sampled generator candidate neural network and sets the new network parameters and new hyperparameters of the discriminator candidate neural network to the values of the network parameters and hyperparameters of the sampled discriminator candidate neural network.

Alternatively, for each pair of candidate neural networks, the system randomly samples a competing pair of candidate neural networks in the population. If the competing pair of candidate neural networks has a higher quality measure than the pair of candidate neural networks, the system sets the new network parameters and new hyperparameters of the generator and discriminator candidate neural networks to the values of the network parameters and hyperparameters of the competing generator and discriminator candidate neural networks, respectively.

explore(•): The system randomly perturbs the hyperparameters of the generator and the discriminator candidate neural network by a pre-determined factor (e.g., by a factor of 2.0 or 0.5) and sets the perturbed hyperparameters for the candidate generator neural network and discriminator neural network as the new hyperparameters for the candidate generator and discriminator neural networks, respectively.

TABLE 1 illustrates an example of a procedure for executing training operations for a population of candidate neural networks:

TABLE 1

Algorithm 1 Population Based Training (PBT)

```
 1: procedure TRAIN(𝒫)                                    ▷ initial population 𝒫
 2:    for (θ, h, p, t) ∈ 𝒫 (asynchronously in parallel) do
 3:       while not end of training do
 4:          θ ← step(θ|h)                                ▷ one step of optimisation using hyperparameters h
 5:          p ← eval(θ)                                  ▷ current model evaluation
 6:          if ready(p, t, 𝒫) then
 7:             h', θ' ← exploit(h, θ, p, 𝒫)             ▷ use the rest of population to find better solution
 8:             if θ ≠ θ' then
 9:                h, θ ← explore(h', θ', 𝒫)             ▷ produce new optimisation hyperparameters h
10:                p ← eval(θ)                            ▷ new model evaluation
11:             end if
12:          end if
13:          update 𝒫 with new (θ, h, p, t + 1)          ▷ update population
14:       end while
15:    end for
16:    return θ with the highest p in 𝒫
17: end procedure
``` eval(•): The candidate discriminator neural network and the candidate generator neural network are evaluated by a variant of the Inception score proposed by Salimans et al., computed from the outputs of a pre-trained classifier. The candidate discriminator neural network and the candidate generator neural network with the better Inception score has the highest quality measure and is considered the "best" in terms of measured fitness.

ready(•) Termination criteria are satisfied after a fixed number of iterations (e.g., $1 \times 10^4$ iterations of step(•)).

exploit(•): The system ranks each pair of candidate generator neural network and discriminator neural networks by ordering each respective pair of quality measures from best to worst. If the pair of candidate neural networks is ranked below a certain threshold (e.g., bottom 20% of all pairs of candidate neural networks), the system samples another pair of candidate neural networks ranked above a certain thresh- Train(•) is an exemplary function a population based neural network training system (e.g., the system 100 of FIG. 1) executes on a population of candidate neural networks. The system executes Train($\mathcal{P}$), where $\mathcal{P}$ is the population of candidate neural networks, and the population repository stores values for the network parameters Θ, hyperparameters h, and quality measure p for each candidate neural network. The system tracks a counter t that is incremented each time the population repository is updated.

The system updates the network parameters for a candidate neural network in the population (shown as Θ←step(Θ|h) in line 4 in TABLE 1). After each iteration of the iterative training process, the system updates the quality measure for the candidate neural network (shown as p←eval(Θ) in line 5 in TABLE 1).

Next, the system checks if the termination criteria are satisfied (shown as a conditional statement in line 6 in TABLE 1 executing ready(p, t, $\mathcal{P}$ )). If termination criteria are satisfied, the system 100 executes: h',Θ'←exploit(h, Θ, p, $\mathcal{P}$ ) for new hyperparameters h' and network parameters Θ' (shown in line 7 in TABLE 1). If the new network parameters and maintained network parameters of the candidate neural network are not equal, then the system executes h, Θ←explore(h', Θ', $\mathcal{P}$ ) to determine new hyperparameters h and new network parameters Θ for the candidate neural network (shown in line 8-9 in TABLE 1). The system updates the quality measure for the candidate neural network again (shown in line 10 in TABLE 1) and the population repository is updated to specify the new values for the hyperparameters, network parameters, and quality measure for the candidate neural network (shown in line 13 in TABLE 1). When training is over, the system generates data specifying a trained neural network by selecting the candidate neural network from the population with the highest quality measure (shown in line 16 in TABLE 1).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Implementations of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network having a plurality of network parameters to perform a particular neural network task and to determine trained values of the network parameters using an iterative training process having a plurality of hyperparameters, the method comprising:
   maintaining a plurality of candidate neural networks and, for each of the plurality of candidate neural networks, data specifying: (i) respective values of the network parameters for the candidate neural network, (ii) respective values of the hyperparameters for the candidate neural network, and (iii) a quality measure that measures a performance of the candidate neural network on the particular neural network task;
   for each of the plurality of candidate neural networks, repeatedly performing the following training operations:
      training the candidate neural network using the iterative training process and in accordance with the maintained values of the hyperparameters for the candidate neural network until termination criteria are satisfied to determine updated values of the network parameters for the candidate neural network from the maintained values of the network parameters for the candidate neural network,
      determining an updated quality measure for the candidate neural network in accordance with the updated values of the network parameters for the candidate neural network and the maintained values of the hyperparameters for the candidate neural network,
      determining, based at least on the maintained quality measures for the plurality of candidate neural networks and the updated quality measure for the candidate neural network, new values of the hyperparameters and the network parameters for the candidate neural network, determining a new quality measure for the candidate neural network in accordance with the new values of the network parameters for the candidate neural network and the new values of the hyperparameters for the candidate neural network, and updating the maintained data for the candidate neural network to specify the new values of the hyperparameters, the new values of the network parameters, and the new quality measure; and selecting the trained values of the network parameters from the parameter values in the maintained data based on the maintained quality measures for the plurality of candidate neural networks after the training operations have repeatedly been performed.

2. The method of claim 1, further comprising:
providing the trained values of the network parameters for use in processing new inputs to the neural network.

3. The method of claim 1, wherein selecting the trained values of the network parameters from the parameter values in the maintained data based on the maintained quality measures for the plurality of candidate neural networks comprises:

selecting the maintained parameter values of the candidate neural network having a best maintained quality measure of any of the plurality of candidate neural networks after the training operations have repeatedly been performed.

4. The method of claim 1, wherein selecting the trained values of the network parameters from the parameter values in the maintained data based on the maintained quality measures for the plurality of candidate neural networks comprises:

determining that a maintained quality measure for a respective candidate neural network in the plurality of candidate neural networks is below a first pre-determined percentage of the plurality of candidate neural networks; and in response, sampling the maintained parameter values of a candidate neural network having a maintained quality measure above a second pre-determined percentage of the plurality of candidate neural networks, after the training operations have repeatedly been performed.

5. The method of claim 1, wherein repeatedly performing the training operations comprises repeatedly performing the training operations in parallel for each candidate neural network.

6. The method of claim 5, wherein repeatedly performing the training operations comprises repeatedly performing the training operations for each candidate neural network asynchronously from performing the training operations for each other candidate neural network.

7. The method of claim 1, wherein determining, based at least on the maintained quality measures for the plurality of candidate neural networks, new values of the hyperparameters and the network parameters for the candidate neural network comprises:

determining whether the updated quality measure is better than other maintained quality measures in the maintained data; and in response to determining that the updated quality measure is not better than the other maintained quality measures, setting the new values of the network parameters to the maintained values of the network parameters for the candidate neural network having the best maintained quality measure.

8. The method of claim 7, further comprising:
in response to determining that the updated quality measure is better than the other maintained quality measures, setting the new values of the network parameters to the updated values of the network parameters.

9. The method of claim 1, wherein determining, based at least on the maintained quality measures for the plurality of candidate neural networks, new values of the hyperparameters and the network parameters for the candidate neural network comprises:

setting the new values of the hyperparameters based upon the maintained values of the hyperparameters for the candidate neural network having the best maintained quality measure.

10. The method of claim 9, wherein setting the new values of the hyperparameters comprises randomly permuting one or more of the maintained values of the hyperparameters of the candidate neural network having the best maintained quality measure.

11. The method of claim 1, wherein determining, based at least on the maintained quality measures for the plurality of candidate neural networks, new values of the hyperparameters and the network parameters for the candidate neural network comprises:

sampling the new values of the hyperparameters from a prior distribution over possible values for the hyperparameters.

12. The method of claim 1, wherein determining, based at least on the maintained quality measures for the plurality of candidate neural networks, new values of the hyperparameters and the network parameters for the candidate neural network comprises:

sampling the new values of the network parameters from a prior distribution over possible values for the network parameters.

13. The method of claim 1, wherein determining, based at least on the maintained quality measures for the plurality of candidate neural networks, new values of the hyperparameters and the network parameters for the candidate neural network comprises:

determining whether the updated quality measure is better than other maintained quality measures in the maintained data; and in response to determining that the updated quality measure is not better than the other maintained quality measures, setting the new values of the hyperparameters to the maintained values of the hyperparameters for the candidate neural network having the best maintained quality measure.

14. The method of claim 1, wherein training the candidate neural network using the iterative training process and in accordance with the maintained values of the hyperparameters for the candidate neural network until termination criteria are satisfied comprises training the candidate neural network until a threshold number of iterations of the iterative training process have been performed.

15. One or more non-transitory computer-readable storage media encoded with instructions that, when executed by one or more computers, cause the one or more computers to perform operations for training a neural network having a plurality of network parameters to perform a particular neural network task and to determine trained values of the network parameters using an iterative training process having a plurality of hyperparameters, the operations comprising:

maintaining a plurality of candidate neural networks and, for each of the plurality of candidate neural networks, data specifying: (i) respective values of the network parameters for the candidate neural network, (ii) respective values of the hyperparameters for the candidate neural network, and (iii) a quality measure that measures a performance of the candidate neural network on the particular neural network task;

for each of the plurality of candidate neural networks, repeatedly performing the following training operations:

training the candidate neural network using the iterative training process and in accordance with the maintained values of the hyperparameters for the candidate neural network until termination criteria are satisfied to determine updated values of the network parameters for the candidate neural network from the maintained values of the network parameters for the candidate neural network, determining an updated quality measure for the candidate neural network in accordance with the updated values of the network parameters for the candidate neural network and the maintained values of the hyperparameters for the candidate neural network, determining, based at least on the maintained quality measures for the plurality of candidate neural networks and the updated quality measure for the candidate neural network, new values of the hyperparameters and the network parameters for the candidate neural network, determining a new quality measure for the candidate neural network in accordance with the new values of the network parameters for the candidate neural network and the new values of the hyperparameters for the candidate neural network, and updating the maintained data for the candidate neural network to specify the new values of the hyperparameters, the new values of the network parameters, and the new quality measure; and selecting the trained values of the network parameters from the parameter values in the maintained data based on the maintained quality measures for the plurality of candidate neural networks after the training operations have repeatedly been performed.

16. A system comprising:

one or more computers and one or more storage devices on which are stored instructions that are operable, when executed by the one or more computers, to cause the one or more computers to perform operations for training a neural network having a plurality of network parameters to perform a particular neural network task and to determine trained values of the network parameters using an iterative training process having a plurality of hyperparameters, the operations comprising:

maintaining a plurality of candidate neural networks and, for each of the plurality of candidate neural networks, data specifying: (i) respective values of the network parameters for the candidate neural network, (ii) respective values of the hyperparameters for the candidate neural network, and (iii) a quality measure that measures a performance of the candidate neural network on the particular neural network task;

for each of the plurality of candidate neural networks, repeatedly performing the following training operations:

training the candidate neural network using the iterative training process and in accordance with the maintained values of the hyperparameters for the candidate neural network until termination criteria are satisfied to determine updated values of the network parameters for the candidate neural network from the maintained values of the network parameters for the candidate neural network, determining an updated quality measure for the candidate neural network in accordance with the updated values of the network parameters for the candidate neural network and the maintained values of the hyperparameters for the candidate neural network, determining, based at least on the maintained quality measures for the plurality of candidate neural networks and the updated quality measure for the candidate neural network, new values of the hyperparameters and the network parameters for the candidate neural network, determining a new quality measure for the candidate neural network in accordance with the new values of the network parameters for the candidate neural network and the new values of the hyperparameters for the candidate neural network, and updating the maintained data for the candidate neural network to specify the new values of the hyperparameters, the new values of the network parameters, and the new quality measure; and selecting the trained values of the network parameters from the parameter values in the maintained data based on the maintained quality measures for the plurality of candidate neural networks after the training operations have repeatedly been performed.

17. The system of claim 16, wherein the operations further comprise:

providing the trained values of the network parameters for use in processing new inputs to the neural network.

18. The system of claim 16, wherein selecting the trained values of the network parameters from the parameter values in the maintained data based on the maintained quality measures for the plurality of candidate neural networks comprises:

selecting the maintained parameter values of the candidate neural network having a best maintained quality measure of any of the plurality of candidate neural networks after the training operations have repeatedly been performed.

19. The system of claim 16, wherein selecting the trained values of the network parameters from the parameter values in the maintained data based on the maintained quality measures for the plurality of candidate neural networks comprises:

determining that a maintained quality measure for a respective candidate neural network in the plurality of candidate neural networks is below a first pre-determined percentage of the plurality of candidate neural networks; and in response, sampling the maintained parameter values of a candidate neural network having a maintained quality measure above a second pre-determined percentage of the plurality of candidate neural networks, after the training operations have repeatedly been performed.

20. The system of claim 16, wherein repeatedly performing the training operations comprises repeatedly performing the training operations in parallel for each candidate neural network.

* * * * *